United States Patent
Murata

(10) Patent No.: US 8,205,587 B2
(45) Date of Patent: Jun. 26, 2012

(54) INTERNAL COMBUSTION ENGINE WITH VARIABLE VALVE GEAR

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 370 days.

(21) Appl. No.: 12/709,032

(22) Filed: Feb. 19, 2010

(65) Prior Publication Data

US 2010/0212617 A1    Aug. 26, 2010

(30) Foreign Application Priority Data

Feb. 23, 2009    (JP) ................. 2009-039233

(51) Int. Cl.
 *F01L 1/34*    (2006.01)
(52) U.S. Cl. ............... 123/90.17; 123/90.15; 464/160
(58) Field of Classification Search ........... 123/90.15, 123/90.17; 464/1, 2, 160
See application file for complete search history.

(56) References Cited

U.S. PATENT DOCUMENTS 7,823,550 B2 *  11/2010  Murata ............... 123/90.15

FOREIGN PATENT DOCUMENTS

| JP | 3-88907 A | 4/1991 |
|---|---|---|
| JP | 3-202602 A | 9/1991 |
| JP | 9-177517 A | 7/1997 |
| JP | 9-177572 A | 7/1997 |
| JP | 11-141313 A | 5/1999 |
| JP | 2003-13716 A | 1/2003 |
| JP | 2004-257373 A | 9/2004 |
| JP | 2006-105062 A | 4/2006 |

* cited by examiner

*Primary Examiner* — Ching Chang
(74) *Attorney, Agent, or Firm* — Birch Stewart Kolasch & Birch, LLP

(57) ABSTRACT

In an engine with a cam phase change mechanism which is disposed on one end portion of an intake camshaft and variably changes a phase of a drive cam of an intake valve relative to a crankshaft, the cam phase change mechanism is configured so that two vane-type hydraulic actuators of which variable-phase torques produced at the same supplied oil pressure are different are arranged axially relative to the intake camshaft.

6 Claims, 15 Drawing Sheets

CROSS SECTION A-A

CROSS SECTION B-B

CROSS SECTION C-C

US 8,205,587 B2

INTERNAL COMBUSTION ENGINE WITH VARIABLE VALVE GEAR

BACKGROUND OF THE INVENTION

1. Field of the Invention

The present invention relates to an internal combustion engine with a cam phase change mechanism capable of changing the phase of an intake cam.

2. Description of the Related Art

Conventionally, there are internal combustion engines that comprise a cam phase change mechanism as a variable valve gear, which changes the phase of an intake cam to vary the opening and closing timings of an intake valve. Further, a technique has been developed in which the cam phase change mechanism is applied to internal combustion engines that are provided with a plurality of intake valves for each cylinder. According to this technique, the opening and closing timings of only some of the intake valves are varied in accordance with the load and engine speed.

In one such internal combustion engine, the opening and closing timings of some of the intake valves are delayed in, for example, low-load operation so that the open period of the intake valves as a whole is increased toward the delay-angle side, whereby a pumping loss is mitigated (Jpn. Pat. Appln. KOKAI Publication No. 3-202602).

However, the technique described in the above patent document has a problem that a valve train is inevitably large-sized, since two camshafts for driving the intake valves are arranged laterally relative to the internal combustion engine.

In order to improve combustibility, moreover, it is advisable to vary the opening timing of each intake valve independently of the closing timing. While the closing timing of the intake valve, in particular, should preferably be widely variable, the valve-opening timing needs only to be slightly variable. As in the technique described in the above patent document, on the other hand, it is difficult for a single cam phase change mechanism to properly control both the opening and closing timings of intake valves with different necessary variable ranges.

SUMMARY OF THE INVENTION

The object of the present invention is to provide an internal combustion engine with a variable valve gear, capable of properly variably controlling both the opening and closing timings of intake valves in an independent manner without failing to make a valve train compact.

In order to achieve the above object, the present invention provides an internal combustion engine with a variable valve gear provided with a cam phase change mechanism which is disposed on one end portion of an intake camshaft and variably changes a phase of a drive cam of an intake valve relative to a crankshaft of the engine. The cam phase change mechanism is configured so that two vane-type hydraulic actuators of which variable-phase torques produced at the same supplied oil pressure are different are arranged axially relative to the intake camshaft.

Thus, the cam phase change mechanism is formed of the two vane-type actuators, so that the opening and closing timings of the intake valve can be variably controlled in an independent manner by one and the other actuators, respectively. Since the variable-phase torques of these two vane-type actuators produced at the same supplied oil pressure are different, moreover, the opening and closing timings can be individually properly controlled with necessary variable responsiveness.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIGS. 10A to 10C are views illustrating operating states of the first and second hydraulic actuators, in which FIG. 10A shows a low- or medium-load state, FIG. 10B shows a high-speed, high-load state, and FIG. 10C shows a low-speed, high-load state;

DETAILED DESCRIPTION OF THE PREFERRED EMBODIMENTS

One embodiment of the present invention will now be described with reference to the accompanying drawings.

Figure 1:
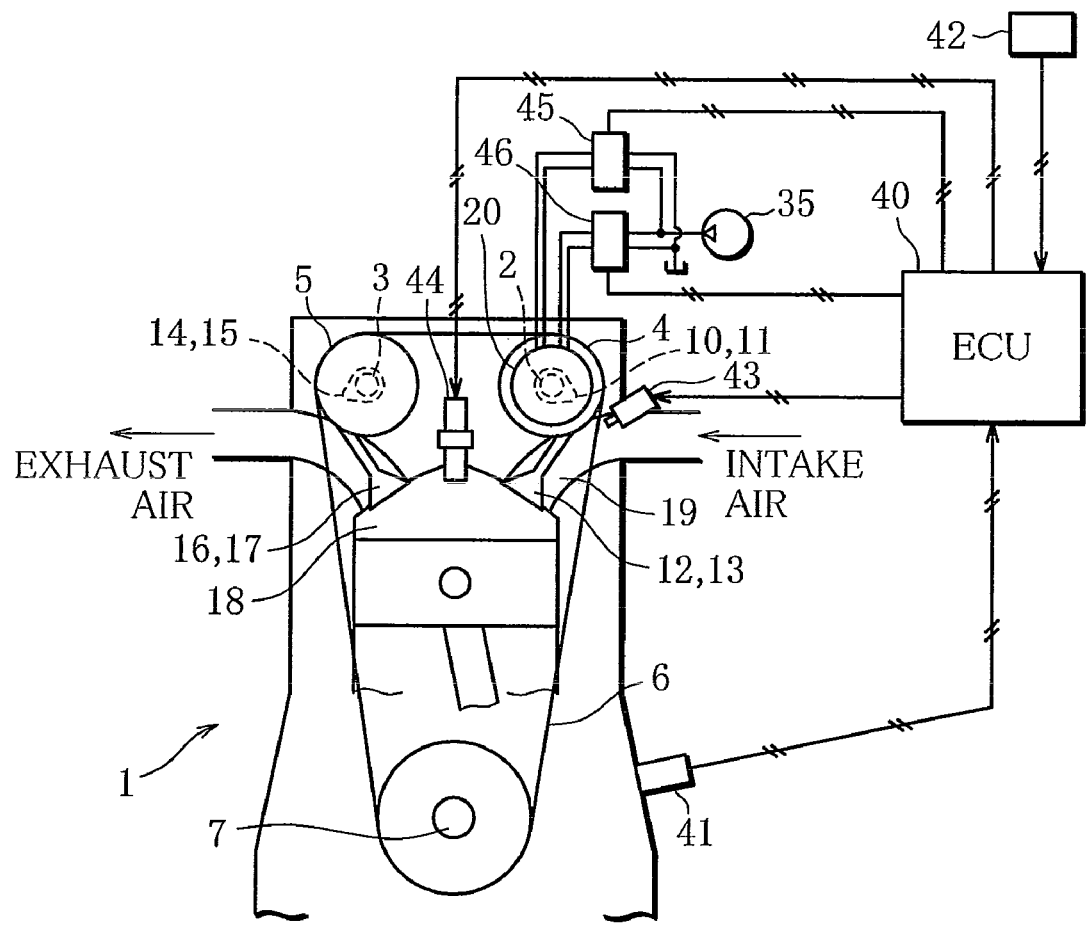
FIG. 1 is a schematic structure diagram of an engine with a variable valve gear according to one embodiment of the invention.

FIG. 1 is a schematic structure diagram of an internal combustion engine (engine 1) with a variable valve gear according to the present embodiment.

As shown in FIG. 1, the engine 1 comprises a DOHC valve train. Cam sprockets 4 and 5 are connected, respectively, to the respective front ends of an intake camshaft 2 and an exhaust camshaft 3 of the engine 1. The cam sprockets 4 and 5 are coupled to a crankshaft 7 by a chain 6. As the crankshaft 7 rotates, the intake and exhaust camshafts 2 and 3 are rotated together with the cam sprockets 4 and 5. Intake valves 12 and 13 are opened and closed by intake cams 10 and 11 on the intake camshaft 2, and exhaust valves 16 and 17 by exhaust cams 14 and 15 on the exhaust camshaft 3.

Figure 2:
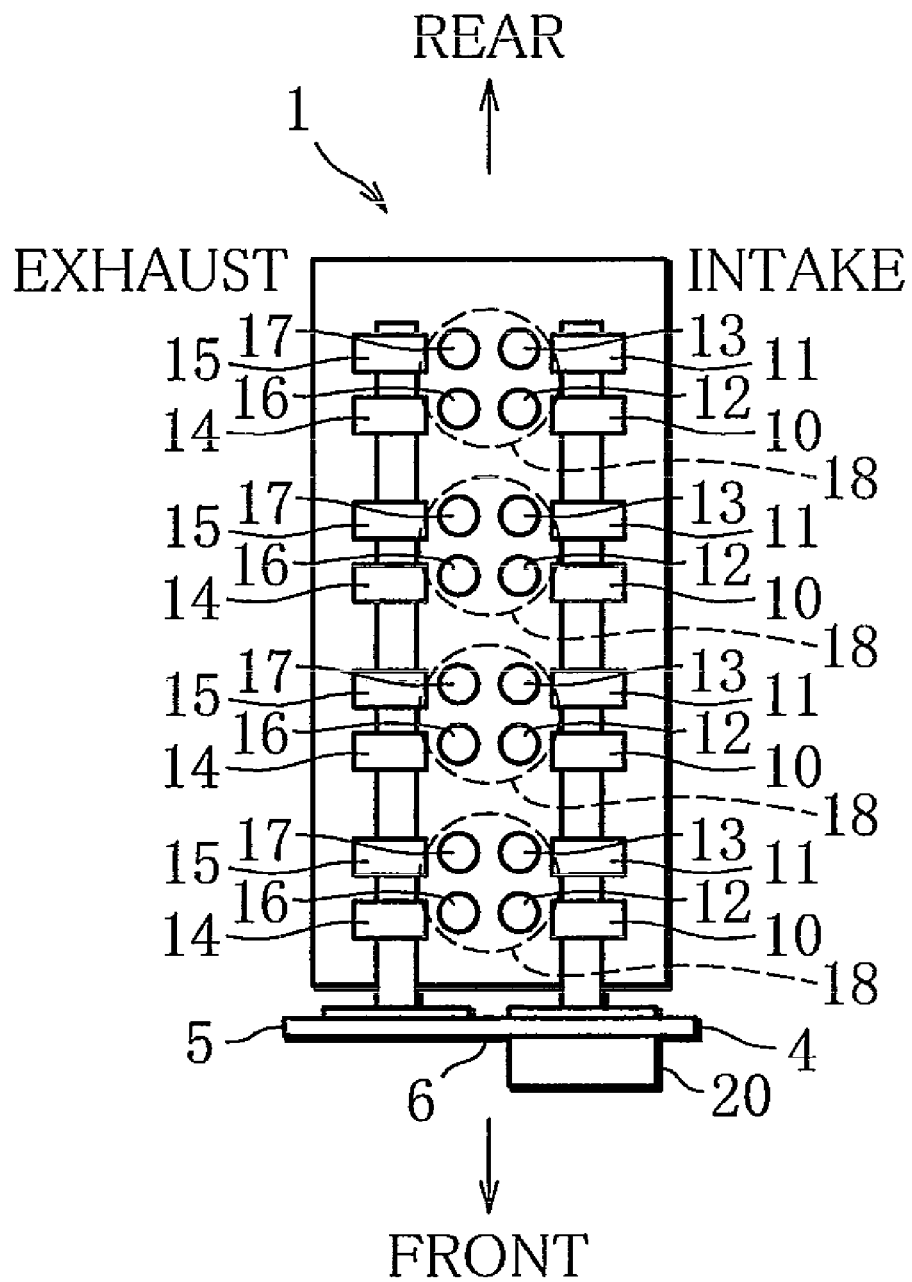
FIG. 2 is a schematic structure view of a valve train.

FIG. 2 is a schematic structure view of the engine 1.

As shown in FIG. 2, the intake camshaft 2 is provided with a cam phase change mechanism 20 as the variable valve gear on its front end portion.

Each cylinder of the engine 1 is provided with two intake valves (first and second intake valves 12 and 13) and two exhaust valves 16 and 17. The first and second intake valves 12 and 13 are arranged longitudinally on the right of the central part of a combustion chamber 18. The two exhaust valves 16 and 17 are arranged longitudinally on the left of the central part of the chamber 18. The first and second intake valves 12 and 13 are driven by the first and second intake cams 10 and 11, respectively. As the first and second intake valves 12 and 13 are arranged in place, the first and second intake cams 10 and 11 are alternately arranged on the intake camshaft 2.

Figure 3:
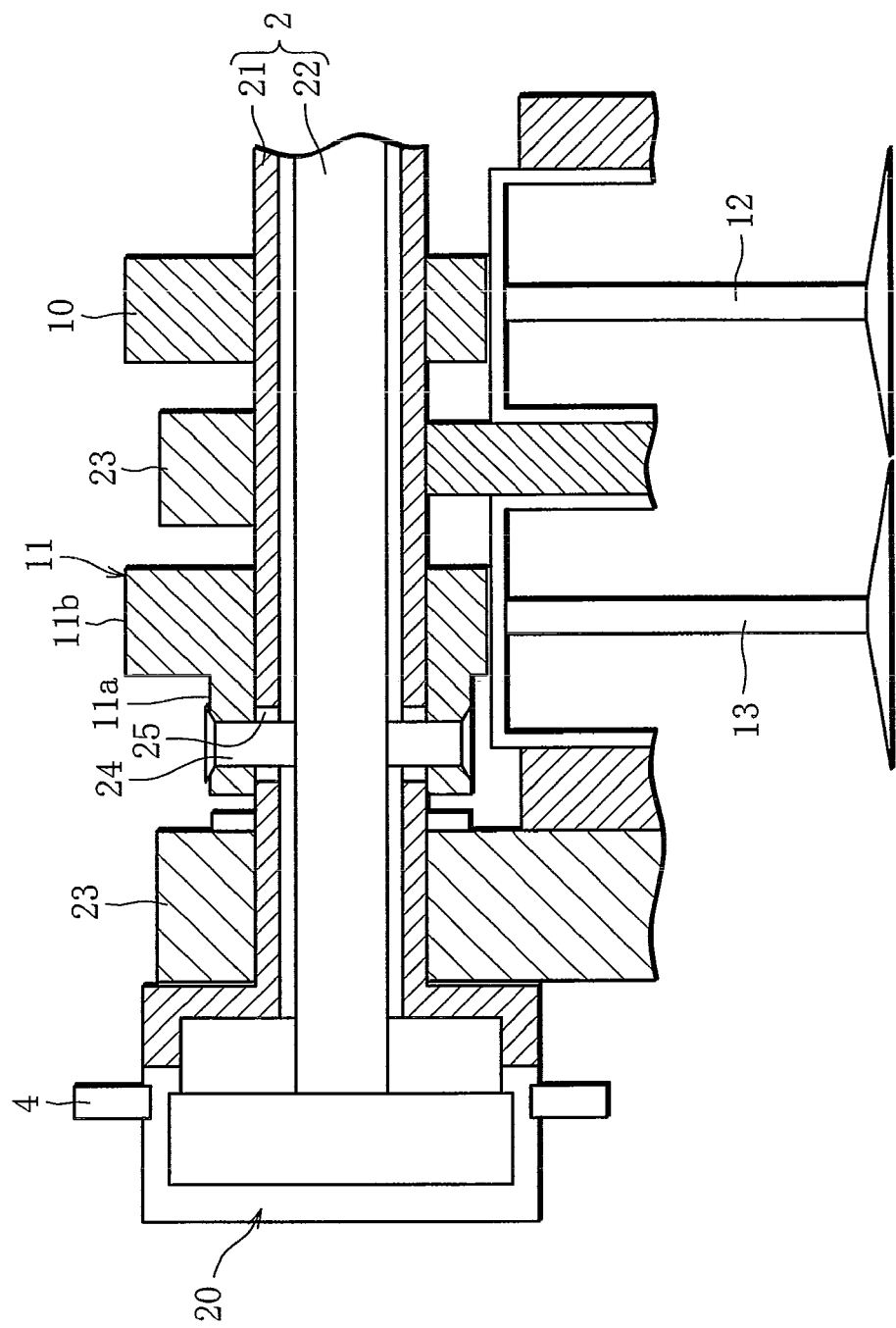
FIG. 3 is a longitudinal sectional view showing the structure of an intake camshaft.
Figure 4:
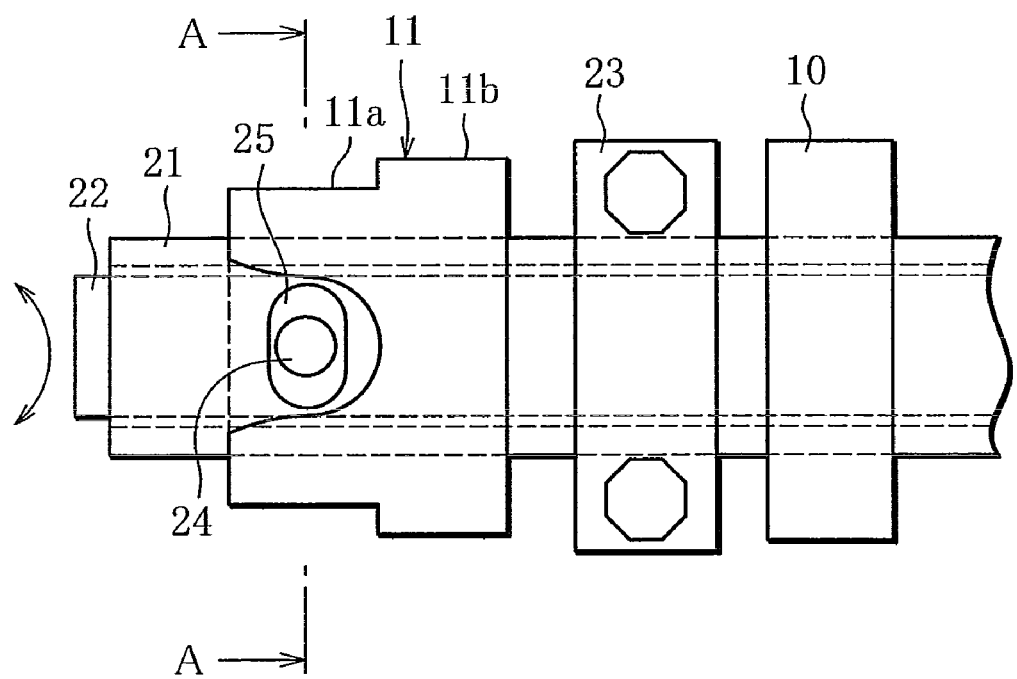
FIG. 4 is a top view showing the structure of a mounting portion for a second intake cam.
Figure 5:
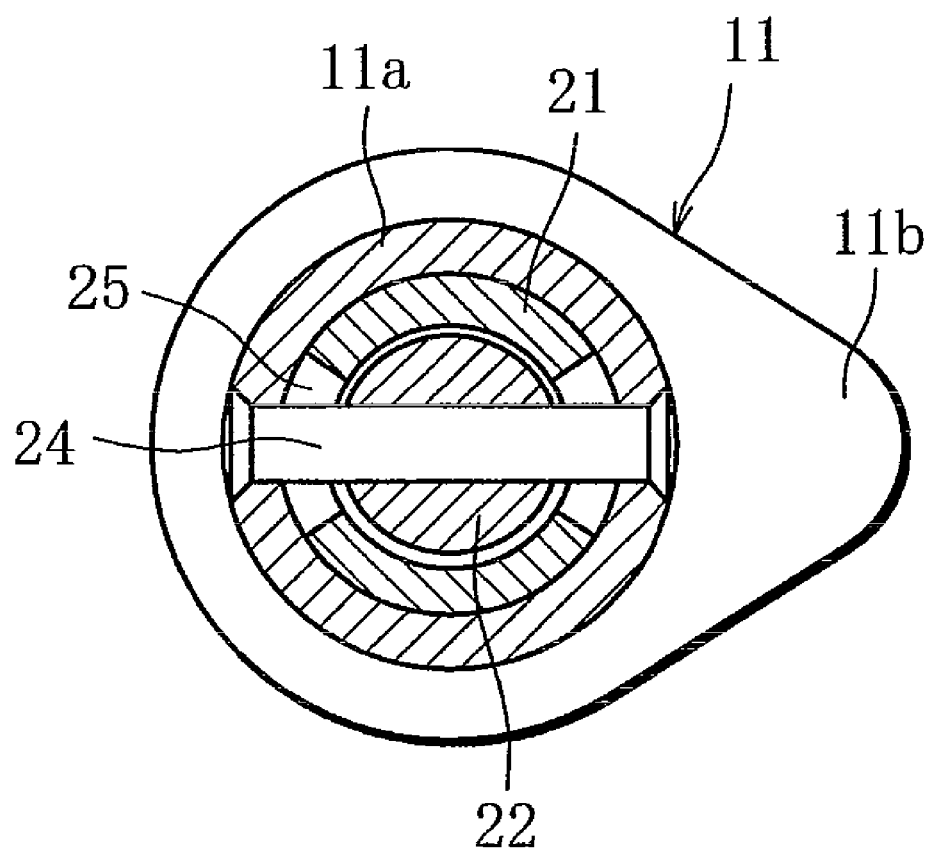
FIG. 5 is a sectional view showing the structure of the mounting portion for the second intake cam.

FIGS. 3 to 5 are structure views of valve trains of the intake valves. FIG. 3 is a longitudinal sectional view showing the structure of the intake camshaft 2, FIG. 4 is a top view showing the structure of a mounting portion for the second intake cam 11, and FIG. 5 is a sectional view of the mounting portion.

As shown in FIGS. 3 to 5, the intake camshaft 2 has a dual structure comprising a hollow first intake camshaft 21 and a second intake camshaft 22 inserted in the first intake camshaft. The first and second intake camshafts 21 and 22 are arranged concentrically with a gap between them and pivotably supported by a cam journal 23 formed on a cylinder head of the engine 1. The first intake cam 10 is fixed to the first intake camshaft 21. Further, the second intake cam 11 is pivotably supported on the first intake camshaft 21. The second intake cam 11 comprises a substantially cylindrical support portion 11a and a cam portion 11b. The first intake camshaft 21 is inserted in the support portion 11a. The cam portion 11b protrudes from the outer periphery of the support portion 11a and serves to drive the second intake valve 13. The second intake cam 11 and the second intake camshaft 22 are fixed to each other by a fixing pin 24. The fixing pin 24 penetrates the support portion 11a of the second intake cam 11 and the first and second intake camshafts 21 and 22. The fixing pin 24 is inserted in a hole in the second intake camshaft 22 without a substantial gap, and its opposite end portions are crimped and fixed to the support portion 11a. A slot 25 through which the fixing pin 24 is passed is formed in the first intake camshaft 21 so as to extend circumferentially.

Figure 6:
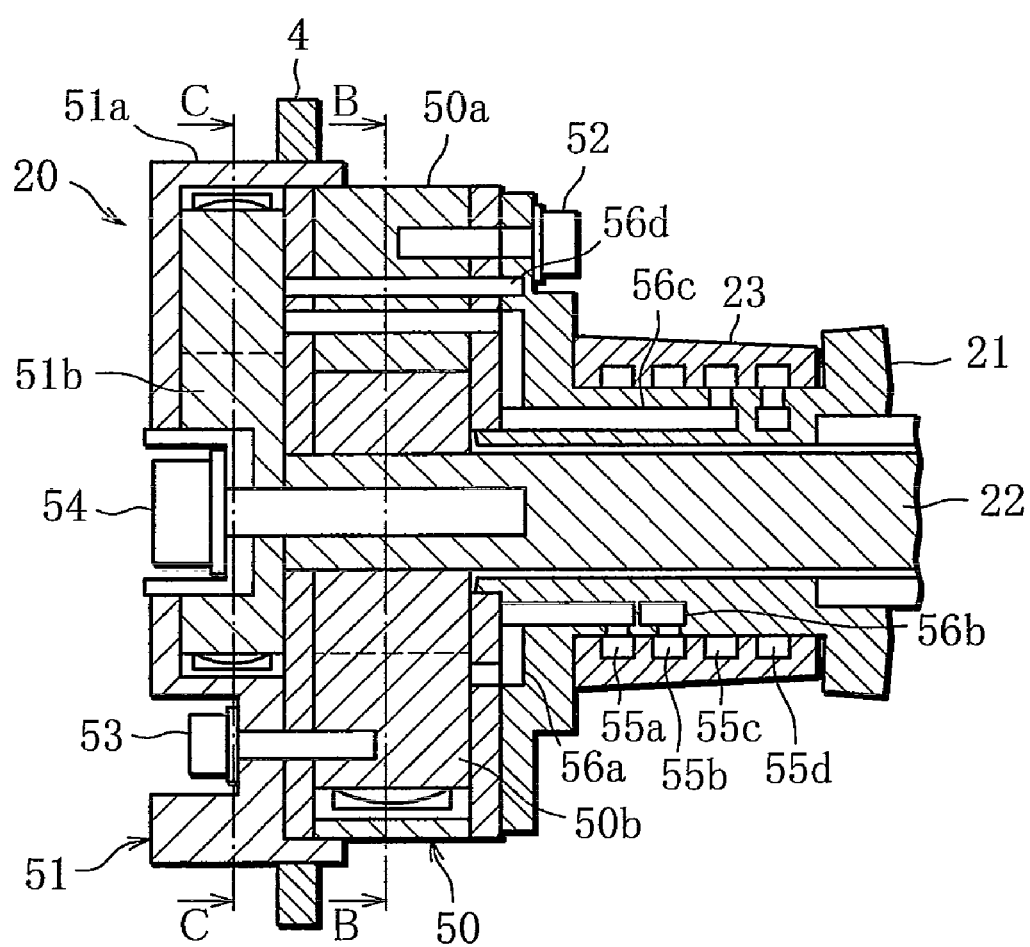
FIG. 6 is a longitudinal sectional view showing the structures of a cam phase change mechanism and its support portion.
Figure 7:
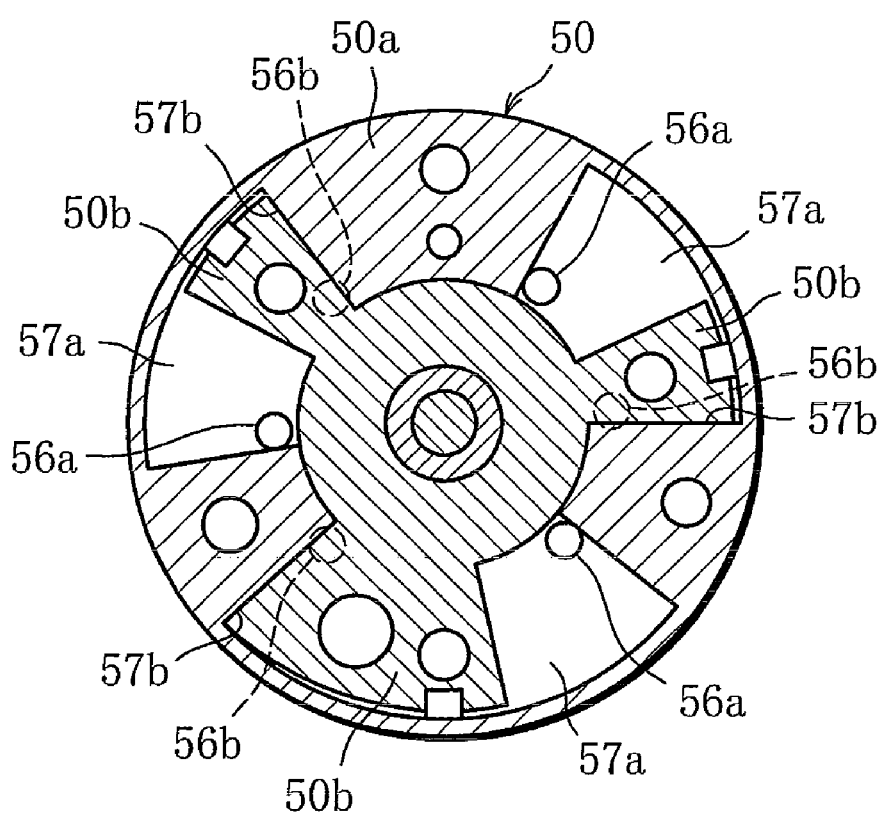
FIG. 7 is a sectional view of a first vane-type hydraulic actuator.
Figure 8:
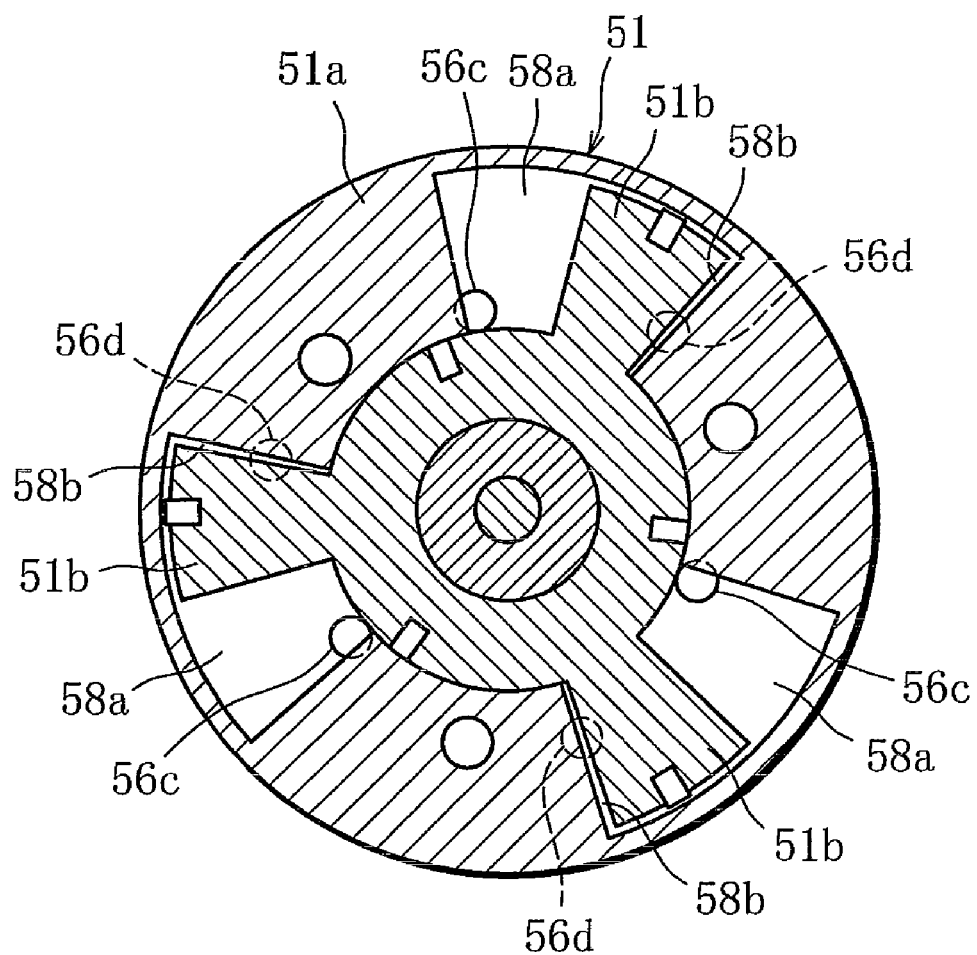
FIG. 8 is a sectional view of a second vane-type hydraulic actuator.

FIGS. 6 to 8 show the structures of the cam phase change mechanism 20 and its support portion. FIG. 6 is a longitudinal sectional view, FIG. 7 is a sectional view of a first vane-type hydraulic actuator 50, and FIG. 8 is a sectional view of a second vane-type hydraulic actuator 51.

As shown in FIG. 6, the cam phase change mechanism 20 is configured so that the first and second hydraulic actuators 50 and 51 are arranged axially.

As shown in FIGS. 6 to 8, the first and second vane-type hydraulic actuators 50 and 51 comprise, respectively, housings (covers) 50a and 51a and vane rotors 50b and 51b that are pivotably mounted in the housings. The first intake camshaft 21 is fastened to the rear end portion of the housing 50a of the first actuator 50 by a bolt 52. The respective housings 50a and 51a of the first and second actuators 50 and 51 are pivotably arranged adjacent to each other. The sprocket 4 is fixed to the outer periphery of the housing 51a of the second actuator 51. The housing 51a of the second actuator 51 and the vane rotor 50b of the first actuator 50 are fastened to each other by a bolt 53. The vane rotor 51b of the second actuator 51 is fastened to the front end portion of the second intake camshaft 22 by a bolt 54.

Thus, the cam phase change mechanism 20 of the present embodiment is configured so that the first and second intake camshafts 21 and 22 are connected to the sprocket 4 through the first and second vane-type hydraulic actuators 50 and 51, respectively.

The cam journal 23 is axially wide and is formed with four oil passages 55a to 55d that are arranged axially. These oil passages 55a to 55d communicate with four oil passages 56a to 56d, respectively, formed in the first intake camshaft 21. The oil passages 56a to 56d are connected in two pairs to the first and second vane-type hydraulic actuators 50 and 51. More specifically, the oil passages 56a and 56b communicate with a delay-angle side oil chamber 57a and an advance-angle side oil chamber 57b of the first hydraulic actuator 50, and the oil passages 56c and 56d with a delay-angle side oil chamber 58a and an advance-angle side oil chamber 58b of the second hydraulic actuator 51.

In the present embodiment, in particular, although the vane diameter of the second vane-type hydraulic actuator 51 is larger than that of the first hydraulic actuator 50, the vane thickness of the former is made smaller than that of the latter so that variable-phase torques generated at the same supplied oil pressure are reduced, that is, the torque capacity of the second actuator 51 is set to be smaller than that of the first actuator 50. Necessary oil flow rates for variable angles can be set to be smaller by thus making the torque capacity of the second hydraulic actuator 51 smaller, so that variable responsiveness is enhanced, and a pumping loss can be effectively mitigated. Since the first and second hydraulic actuators 50 and 51 are arranged axially, moreover, their mountability can be improved if the second actuator 51 is axially thinned so that its capacity is reduced.

Further, the second vane-type hydraulic actuator 51 is constructed so that the number of its vanes is made smaller than that of the first hydraulic actuator 50 to enlarge a variable-phase range, that is, an angle for which the vane rotor is rotatable relative to the housing. Accordingly, the first hydraulic actuator 50 can be subjected to delay angle control such that the opening timing of the first intake valve 12 is near a top dead center, and the second hydraulic actuator 51 can also be subjected to delay angle control such that the closing timing of the second intake valve 13 is greatly delayed to the second half of a compression stroke. Thus, the pumping loss can be considerably mitigated to improve the fuel efficiency. Even in the case where the opening timing of the first intake valve 12 is controlled toward the advance-angle side by the first hydraulic actuator 50 to extend a period for an overlap with the exhaust valves so that an internal EGR is increased to reduce the fuel consumption or exhaust emission, furthermore, the rotatable angle of the vane rotor of the second hydraulic actuator 51 is so great that the closing timing of the second intake valve 13 can be fully delayed. Thereupon, the pumping loss is mitigated, and the first and second intake valves 12 and 13 are differentiated in opening timing. By doing this, swirls can be produced in the combustion chamber 18 to also improve the combustion stability.

An ECU 40 shown in FIG. 1 is provided with an input-output device (not shown), storage devices such as ROM and RAM, central processing unit (CPU), etc., and generally controls the engine 1.

Various sensors, such as a crank angle sensor 41 and a throttle sensor 42, are connected to the input side of the ECU 40. The crank angle sensor 41 detects the crank angle of the engine 1. The throttle sensor 42 detects the opening of a throttle valve (not shown). Further, a fuel injection valve 43, spark plug 44, etc. are connected to the output side of the ECU 40. The ECU 40 determines the ignition timing, injection quantity, etc., based on detected information from the sensors, and drivingly controls the spark plug 44 and the fuel injection valve 43. Also, a first oil control valve (hereinafter referred to as OCV) 45 for drivingly controlling the first hydraulic actuator 50 and a second OCV 46 for drivingly controlling the second hydraulic actuator 51 are connected to the output side of the ECU 40. The ECU 40 controls the first and second OCVs 45 and 46 based on the detected information from the sensors.

Figure 9:
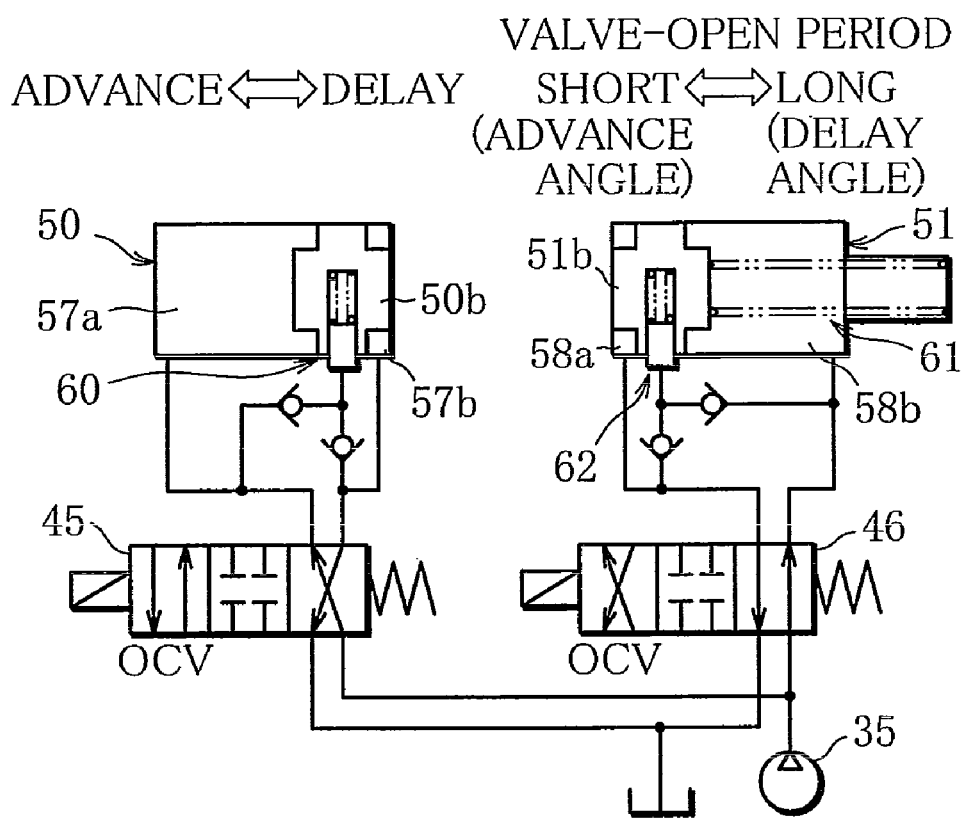
FIG. 9 is a hydraulic circuit diagram showing the first and second hydraulic actuators.
Figure 10A:
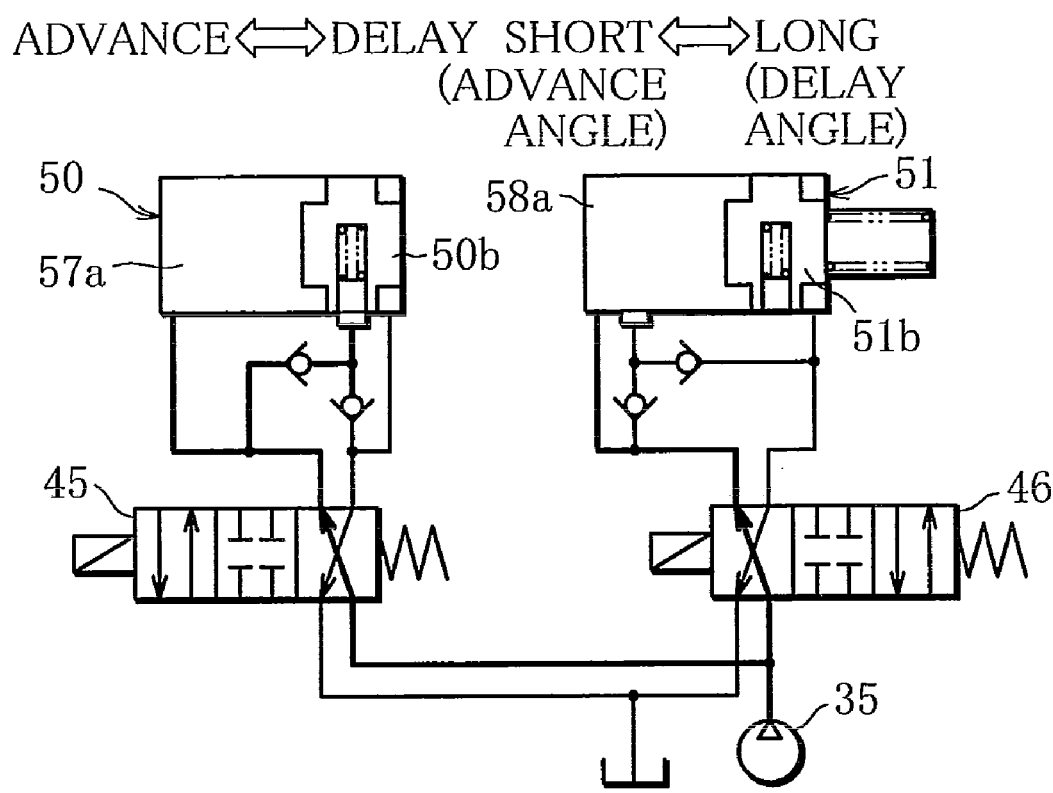
Figure 10B:
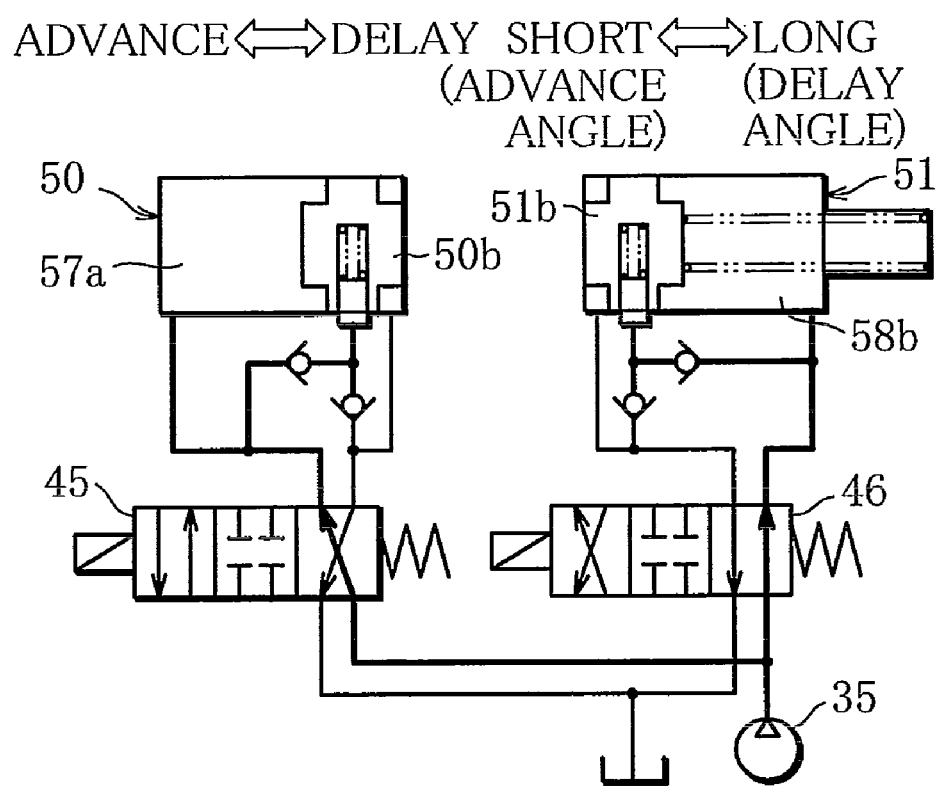
Figure 10C:
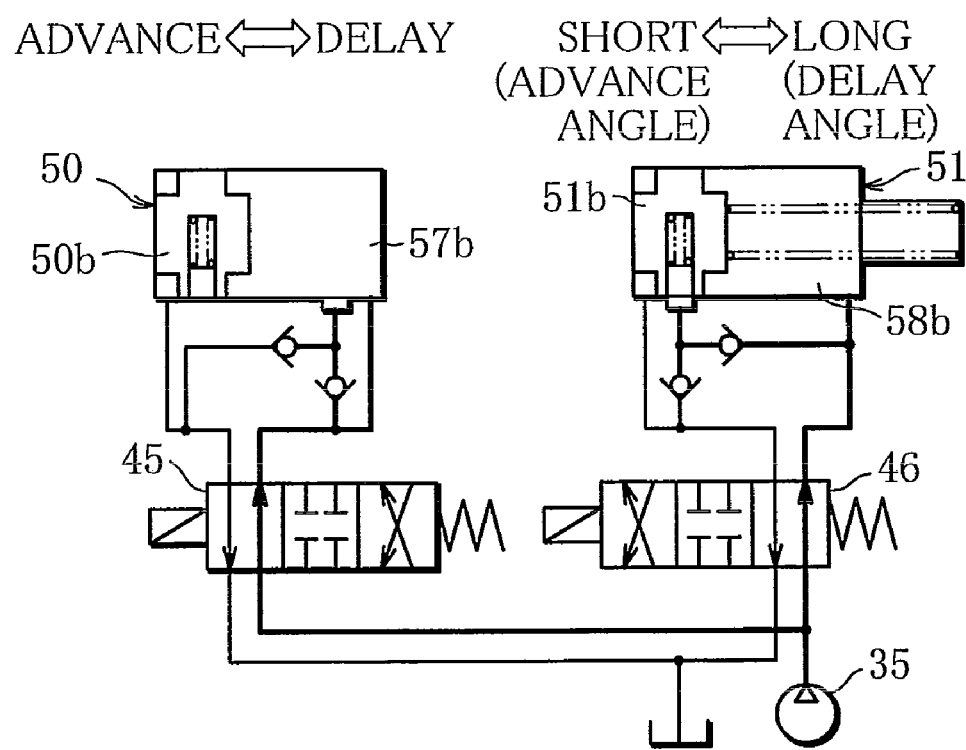

FIG. 9 is a hydraulic circuit diagram showing the first and second vane-type hydraulic actuators 50 and 51. In the state shown in FIG. 9, the engine is stopped or just started. FIGS. 10A to 10C are views illustrating operating states of the first and second hydraulic actuators 50 and 51, in which FIG. 10A shows a low- or medium-load state, FIG. 10B shows a high-speed, high-load state, and FIG. 10C shows a low-speed, high-load state.

In the first vane-type hydraulic actuator 50, as shown in FIG. 9, the delay- or advance-angle side oil chamber 57a or 57b is alternatively supplied with a hydraulic fluid from an oil pump 35 as the first OCV 45 is switched. In the second vane-type hydraulic actuator 51, on the other hand, the delay- or advance-angle side oil chamber 58a or 58b is alternatively supplied with the hydraulic fluid from the oil pump 35 as the second OCV 46 is switched.

The first vane-type hydraulic actuator 50 is provided with a locking device 60, which serves to regulate the movement of the vane rotor 50b in the most delayed angle position. The locking device 60 is unlocked if the hydraulic fluid is supplied to the first hydraulic actuator 50. The second vane-type hydraulic actuator 51 is provided with a spring 61 for urging on the advance-angle side and a locking device 62, which serves to regulate the movement of the vane rotor 51b in the most advanced angle position. The locking device 62 is unlocked if the hydraulic fluid is supplied to the second hydraulic actuator 51.

If the hydraulic fluid supply from the oil pump 35 is insufficient, as when the engine is stopped or just started, the vane rotors 50b and 51b of the first and second hydraulic actuators 50 and 51 are located on the delay- and advance-angle sides, respectively, and are locked in position by the locking device 60 and 62, respectively.

In the low- or medium-load state, as shown in FIG. 10A, the hydraulic fluid from the oil pump 35 is introduced into the respective delay-angle side oil chambers 57a and 58a of the first and second hydraulic actuators 50 and 51.

In the high-load state, as shown in FIG. 10B, the hydraulic fluid from the oil pump 35 is introduced into the delay-angle side oil chamber 57a of the first hydraulic actuator 50 and the advance-angle side oil chamber 58b of the second hydraulic actuator 51.

In the low-speed, high-load state, as shown in FIG. 10C, the hydraulic fluid from the oil pump 35 is introduced into the respective advance-angle side oil chambers 57b and 58b of the first and second hydraulic actuators 50 and 51.

The first and second OCVs 45 and 46 are sequentially switched in accordance with a map based on an engine speed N and a load L.

Figure 11:
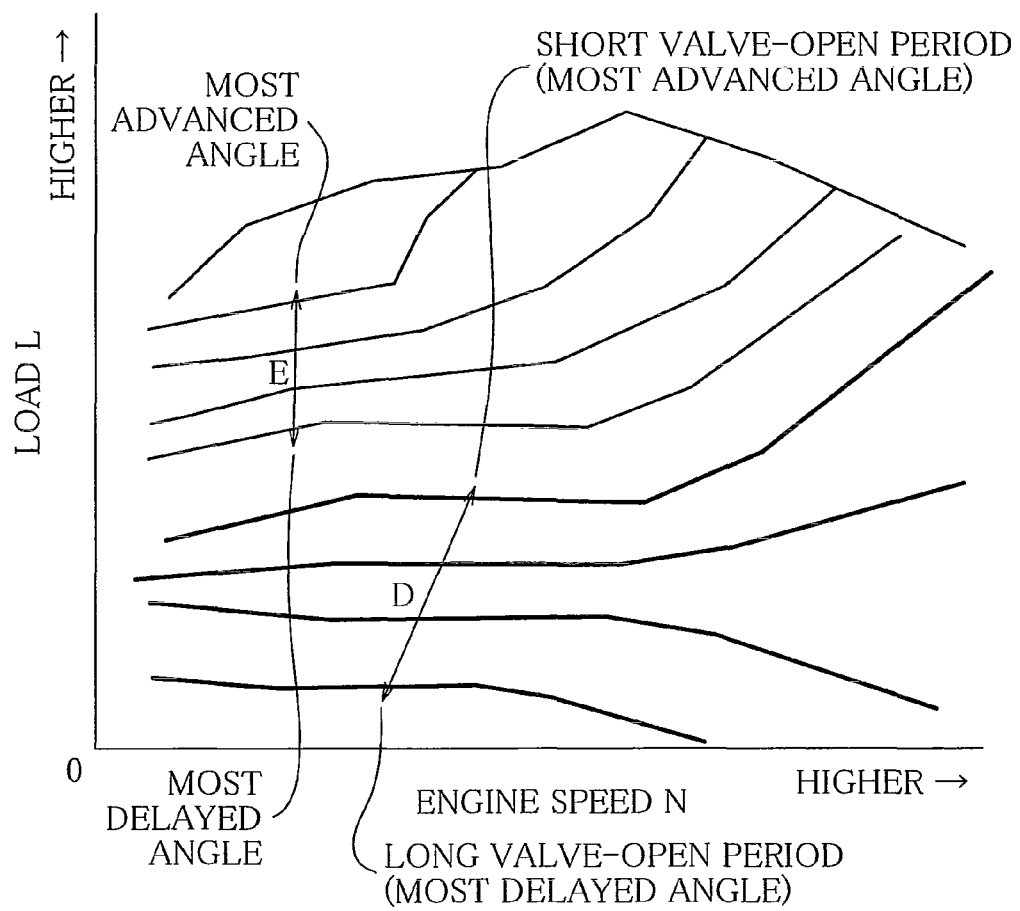
FIG. 11 is an example of a map used in operation setting for the cam phase change mechanism.

FIG. 11 is an example of a map used in operation setting for the cam phase change mechanism 20.

In the low-load state, as shown in FIG. 11, the first vane-type hydraulic actuator 50 is controlled for the most delayed angle, and the second vane-type hydraulic actuator 51 is drivingly controlled in accordance with the load L and engine speed N (D in FIG. 11). In the high-load state, on the other hand, the second hydraulic actuator 51 is controlled for the most advanced angle, and the first hydraulic actuator 50 is drivingly controlled in accordance with the load L and engine speed N (E in FIG. 11).

Thus, in the engine 1 of the present embodiment, the opening and closing timings of the first intake valve 12 are adjusted for the most delayed angle by the first hydraulic actuator 50 and delayed by the second hydraulic actuator 51. Since the rotatable angle or variable-phase range of the second hydraulic actuator 51 is wider than the variable-phase range of the first hydraulic actuator 50, as described above, the closing timing of the second intake valve 13 can be greatly delayed. Accordingly, a period between the opening timing of the first intake valve 12 and the closing timing of the second intake valve 13, that is, a valve-open period, can be considerably increased toward the delay-angle side. Consequently, the pumping loss can be mitigated to improve the fuel efficiency.

Moreover, the torque capacity of the second vane-type hydraulic actuator 51 is so small that the variable responsiveness can be set high and the pumping loss can be effectively mitigated, depending on the varying operating states, to further improve the fuel efficiency.

In the high-load state, on the other hand, the second hydraulic actuator 51 is advance-controlled so that the valve-open period is reduced. If the second intake valve 13 is closed in, for example, the first half of the compression stroke, that is, near a region where intake air is pushed back into an intake port by a piston, the charging efficiency of the intake air can be enhanced to secure the output. In the low-speed, high-load state, in particular, the opening timing of the first intake valve 12 is advanced by the first hydraulic actuator 50. Thus, by advancing the opening timing of the first intake valve 12 to or just ahead of the top dead center (TDC), for example, the pumping loss in an initial stage of an intake stroke can be mitigated, and a strong inertial or pulsating supercharging effect can be obtained. In the low-speed, high-load state, therefore, the fuel efficiency can be further improved to secure good combustion stability.

Thus, by drivingly controlling the first and second vane-type hydraulic actuators 50 and 51 depending on the operating state of the engine 1, the opening and closing timings of the intake valves 12 and 13 can be properly controlled.

Since the cam phase change mechanism 20 has an integrated configuration such that the two vane-type hydraulic actuators are arranged longitudinally, it can be made compact.

Further, the capacity of the second vane-type hydraulic actuator 51 is set to be smaller than that of the first vane-type hydraulic actuator 50, and its vane diameter larger. Since the vane thickness can be considerably reduced, therefore, the cam phase change mechanism 20 can be compactified axially, in particular.

On the other hand, the vane thickness of the first vane-type hydraulic actuator 50 is greater than that of the second hydraulic actuator 51. Therefore, a large capacity can be secured despite the small diameter.

In the low-load state, moreover, the ECU 40 controls the second hydraulic actuator 51 to extend the valve-open period after controlling the first hydraulic actuator 50 for the most delayed angle. Thus, the actuators 50 and 51 are not simultaneously activated but sequentially controlled, so that accurate driving control can be achieved without involving a deficiency of oil pressure.

Although the second hydraulic actuator 51 uses fewer vanes than the first hydraulic actuator 50 in the present embodiment, the same number of vanes may be used in these two actuators.

Although the first and second vane-type hydraulic actuators 50 and 51 are arranged adjacent to each other on the front end portion of the intake camshaft 2 in the embodiment described herein, moreover, the present invention is not limited to this arrangement.

Figure 12:
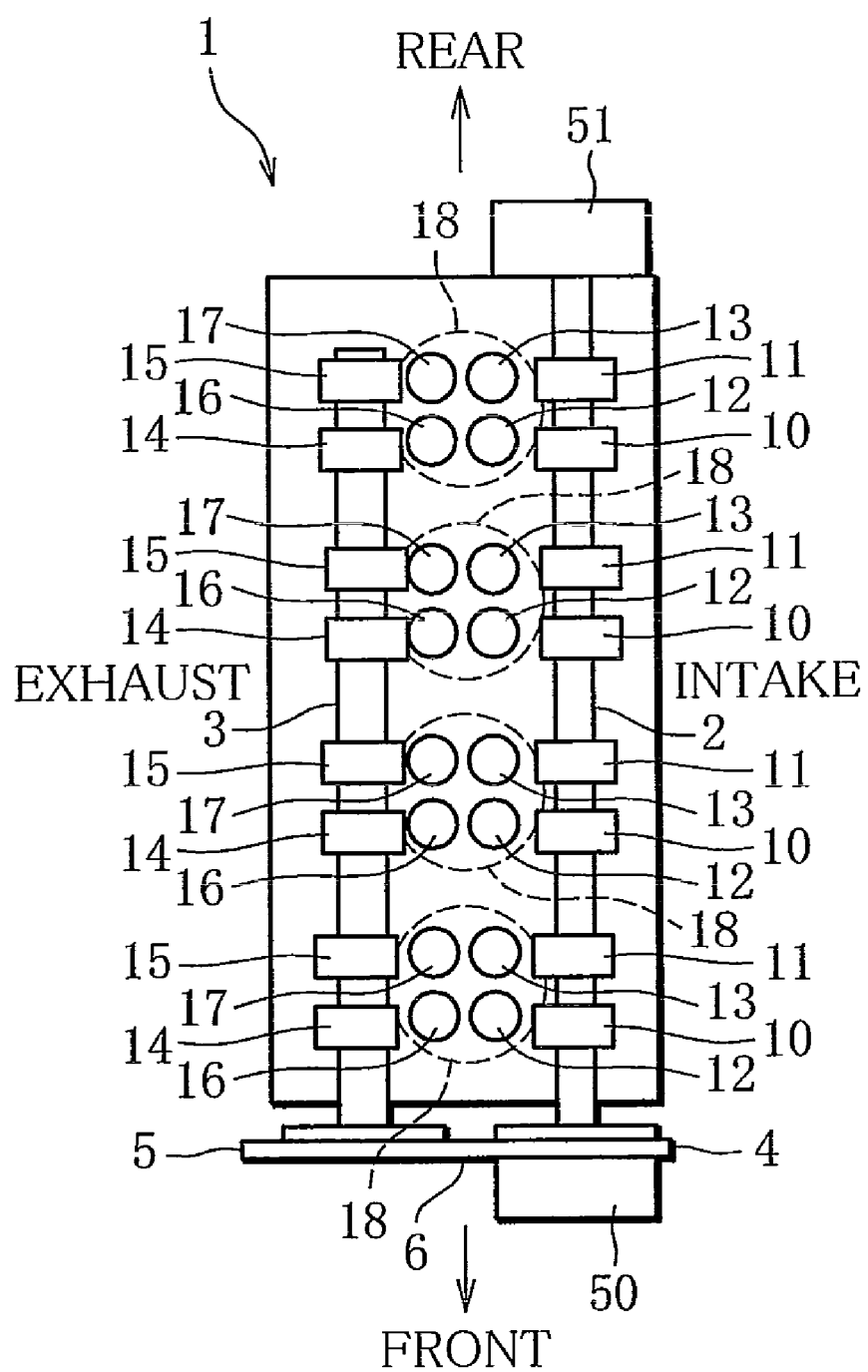
FIG. 12 is a schematic structure view of a valve train according to another embodiment.
Figure 13:
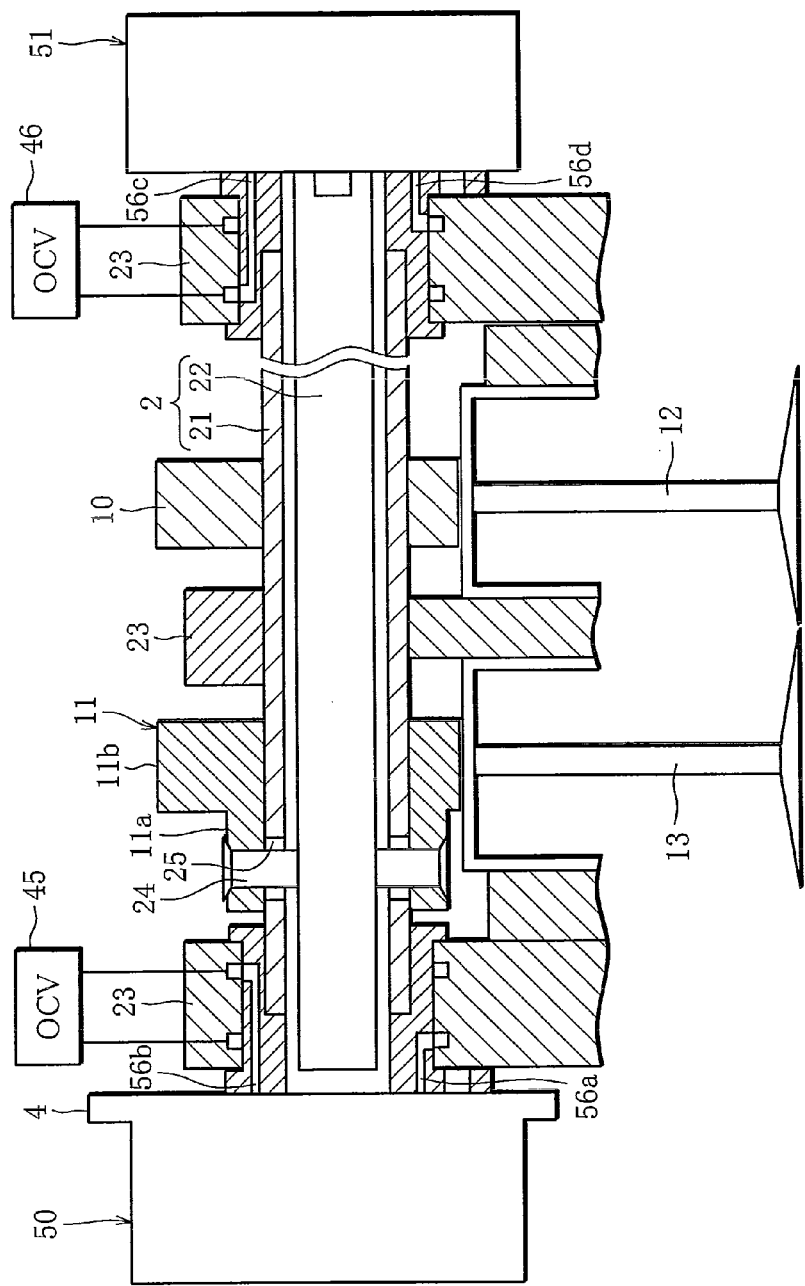
FIG. 13 is a longitudinal sectional view showing the structure of an intake camshaft according to the alternative embodiment.

As shown in FIGS. 12 and 13, for example, first and second vane-type hydraulic actuators 50 and 51 may be disposed on front and rear end portions, respectively, of the intake camshaft 2.

In another embodiment of the invention shown in FIGS. 12 and 13, a cam sprocket 4 is provided on a housing of the first hydraulic actuator 50, and a first intake camshaft 21 is fixed to a vane rotor of the actuator 50. On the other hand, the first intake camshaft 21 is fixed to a housing of the second hydraulic actuator 51, and a second intake camshaft 22 is connected to the actuator 51.

In the present embodiment, therefore, the first hydraulic actuator 50 varies the respective phases of first and second intake cams 10 and 11 relative to a crankshaft 7, while the second hydraulic actuator 51 varies the phase of the second intake cam 11 relative to the first intake cam 10.

Also in the present embodiment arranged in this manner, an increase in the transverse dimension of the engine 1 attributable to the disposition of the cam phase change mechanism can be suppressed to realize a compact configuration. The configuration according to the present embodiment is suited for the case where a wide space is secured at the back of the engine and a narrow space in front.

According to the present embodiment, moreover, the first vane-type hydraulic actuator 50 requires a somewhat large torque capacity to accommodate the input of the crankshaft rotation and vary the phase of the first intake camshaft 21 along with the second hydraulic actuator 51. On the other hand, the second hydraulic actuator 51 requires only a small torque capacity, since it is designed to receive a rotation input from the first hydraulic actuator 50 and vary the phase of the second intake camshaft 22. Thus, in the second hydraulic actuator 51, the vanes are reduced in size and number so that their area subjected to the oil pressure is smaller and the necessary oil flow rates for the variable angles are lower. By doing this, the flow rate of oil supplied to the first hydraulic actuator 50 can be maintained so that the actuator 50 can securely vary the phases of the first and second intake camshafts 21 and 22 together.

What is claimed is:

1. An internal combustion engine with a variable valve gear comprising a first intake valve and a second intake valve in each cylinder and a cam phase change mechanism which is disposed on one end portion of an intake camshaft and varies phases of drive cams of the first and second intake valves relative to a crankshaft of the engine, wherein the cam phase change mechanism is formed of a first vane-type hydraulic actuator that varies, the phase of the drive cam of the first intake valve and a second vane-type hydraulic actuator that varies the phase of the drive cam of the second intake valve;

the first vane-type hydraulic actuator varies the phase of the drive cam of the first intake valve and a phase of the crankshaft of the engine;

the second vane-type hydraulic actuator varies the phase of the drive cam of the second intake valve and the phase of the drive cam of the first intake valve; and variable-phase torques produced at the same supplied oil pressure is larger in the first vane-type hydraulic actuator than in the second vane-type hydraulic actuator.

2. The internal combustion engine with a variable valve gear according to claim 1, wherein the second vane-type hydraulic actuator is set to have a variable-phase angular range wider than that of the first vane-type hydraulic actuator.

3. The internal combustion engine with a variable valve gear according to claim 2, wherein the internal combustion engine comprises a first intake valve and a second intake valve in each cylinder, the intake camshaft comprises a hollow first intake camshaft to which the drive cam of the first intake valve is fixed and a second intake camshaft to which the drive cam of the second intake valve is fixed and which is rotatably inserted in the first intake camshaft, and the first vane-type hydraulic actuator is disposed on an end portion of the first intake camshaft and the second vane-type hydraulic actuator on an end portion of the second intake camshaft.

4. The internal combustion engine with a variable valve gear according to claim 3, wherein the first vane-type hydraulic actuator is disposed on one end portion of the intake camshaft, and the second vane-type hydraulic actuator is disposed on the other end portion of the intake camshaft.

5. The internal combustion engine with a variable valve gear according to claim 2, wherein the second vane-type hydraulic actuator comprises fewer vanes than the first vane-type hydraulic actuator.

6. The internal combustion engine with a variable valve gear according to claim 1, wherein the first and second vane-type hydraulic actuators are supplied with a hydraulic fluid through oil passages formed in the intake camshaft and a cam journal supporting the intake camshaft.

* * * * *